US011683005B2

(12) United States Patent
Praca

(10) Patent No.: US 11,683,005 B2
(45) Date of Patent: Jun. 20, 2023

(54) DUAL PARALLEL AXIS SOLAR TRACKER SYSTEM

(71) Applicant: Miguel M. L. Praca, Cascais (PT)

(72) Inventor: Miguel M. L. Praca, Cascais (PT)

( * ) Notice: Subject to any disclaimer, the term of this patent is extended or adjusted under 35 U.S.C. 154(b) by 23 days.

(21) Appl. No.: 17/610,429

(22) PCT Filed: Aug. 5, 2020

(86) PCT No.: PCT/US2020/044968
§ 371 (c)(1),
(2) Date: Nov. 10, 2021

(87) PCT Pub. No.: WO2021/030109
PCT Pub. Date: Feb. 18, 2021

(65) Prior Publication Data
US 2022/0376649 A1 Nov. 24, 2022

Related U.S. Application Data

(60) Provisional application No. 62/885,574, filed on Aug. 12, 2019.

(51) Int. Cl.
*H02S 20/32* (2014.01)
*H02S 20/10* (2014.01)
*F16C 1/02* (2006.01)

(52) U.S. Cl.
CPC ............... *H02S 20/32* (2014.12); *F16C 1/02* (2013.01); *H02S 20/10* (2014.12)

(58) Field of Classification Search
CPC ............. H02S 20/10; H02S 20/32; F16C 1/02
See application file for complete search history.

(56) References Cited

U.S. PATENT DOCUMENTS

2013/0276862 A1* 10/2013 Luo .................. H02S 20/10
136/246
2014/0223844 A1* 8/2014 Luo .................. E04D 13/00
52/173.3

FOREIGN PATENT DOCUMENTS

KR 20110102706 * 9/2011

* cited by examiner

*Primary Examiner* — Jayne L Mershon
(74) *Attorney, Agent, or Firm* — Law Office of John Stattler

(57) ABSTRACT

A dual drive shaft solar tracker system comprises a photovoltaic (PV) structure, which includes at least one solar panel, a support structure and first and second drive shafts. The first and second drive shafts comprise first and second belt mechanisms wherein movement of the PV structure occurs by wrapping belts of the first belt mechanism onto the first drive shaft and by wrapping belts of the second belt mechanism onto the second drive shaft so as to provide a non-linear wrapping rate to accommodate the non-linearity of the belt wrapping onto the first and second drive shafts. A linkage, which ties two rows that are unbalanced in opposite directions, cancels out the imbalance as long as both rows have identical components. This allows trackers to use PV modules of any size and weight and the perfect balance is unaffected.

20 Claims, 16 Drawing Sheets

DUAL PARALLEL AXIS SOLAR TRACKER SYSTEM

RELATED APPLICATIONS

This application claims priority, under 35 U.S.C. § 119(e), to United States Provisional Application No. 62/885,574, entitled "Dual Parallel Axis Solar Tracker System", inventor Miguel M. L. Praca, filed Aug. 12, 2019, and is expressly incorporated herein by reference.

FIELD OF INVENTION

The present invention relates to rotatable solar tracker systems, and more specifically to dual axis solar tracker systems with a linked self-balancing mechanism.

BACKGROUND OF THE INVENTION

The dual axis solar tracker system, disclosed herein, presents a new alternative to a number of conventional configurations of single axis solar trackers, and a new approach to drive the motion of the system with two motors. This configuration has benefits when used in other types of solar trackers.

The general approach used to drive a single axis solar tracker (SAST) is with an electric motor that drives a shaft that is concentric or parallel to the axis of rotation of a row. Examples of this configuration are Next Tracker's NX Horizon and Game Change's Genius Tracker.

A row may be a single structure mounted on a torque tube that is supported on bearings aligned concentrically about the axis of rotation; each bearing is mounted on a post or grounded structure. A row may also be composed of modular tables, each comprising typically two or more posts, and driven through a drive shaft that may be concentric to the axis of rotation or parallel to it. These tables are not necessarily in perfect alignment and are connected through a drive shaft that accommodates some misalignment of consecutive tables. Examples of such tables are RBI's Sunflower Tracker, Ideematec's Safetrack Horizon, and Alion Energy's Storm Tracker.

In general, the modular table designs have an advantage in that the torque reaction for a whole row is distributed through all the posts, while the single torque tube designs require grounding of the drive support in a way that it holds the torque reaction to all the torque loads on the full row. The long torque tube approach requires a stronger structure to ground the drive (typically composed of a motor and a worm drive), and a torsionally stiff torque tube that can resist the accumulated dynamic rotational loads for the whole row.

Table based designs are all connected through a drive shaft, but they differ in the reduction ratio achieved, and the way the torque is transmitted from the drive to the rotating table. Cable or belt driven systems are desirable in that they hold the torque loads as far as possible from the center of rotation at a large radius, resulting in lower forces (Force=Torque/radius). That improves the load capacity of the system and the size of the load bearing components.

The large gear approach proposed by Alion achieves a gear ratio of about 10/1 while the forces are transmitted at a radius of about 12 inches. The belt drive system proposed obtains gear ratios about twice as high, reducing the torque loads on the drive shaft by half.

In a gearbox system, like the Sunflower, the gear ratio is much higher (361/1) reducing the shaft torque requirements, but the direct connection from the gearbox to the rotating system means that the forces resisting torque loads are applied at a radius of 3 in, so the forces are relatively high. Also these high ratio gearboxes have very low efficiency, which reduces the advantage of the high gear ratio. The gearbox system has other advantages in terms of simplicity of assembly, but once tooled it is very confined to solutions that rely in reducing the number of modules per table to adjust for increased loads. Major changes to the size of the table cannot be accommodated without a major gearbox redesign and multiple versions of an expensive reduction gearing.

The Ideematec cable driven solution seems to have a high load capacity so that it can be applied to wider row trackers (double row in portrait). However, the approach to resolve the non-linearity of the cable wrapping mechanically has the disadvantage that it is tooled for a single solution. The geometry of the drive cable arrangement cannot be altered to accommodate different width tables. Also, the Ideematec solution results in a larger radius of cable wrapping than might be desirable, so loads are high. The reduction ratios are around 8/1 and can be doubled by using a block and doubling the cable.

As described below, the embodiments disclosed herein overcome the shortcoming noted in some of the tracker systems referenced above.

SUMMARY

The embodiments disclosed herein of a dual drive shaft system have the advantages of the cable drive without some of the limitations of present systems. In addition to the novel dual shaft drive system, which may be applied to other configurations, some embodiments disclosed herein also employ a novel mechanism to achieve perfect balancing of rows, reducing any gravity loads to zero. In general, gravity loads incurred in present systems result from the inability of those systems to achieve coincidence between the center of rotation with the center of gravity. Even in systems designed to minimize that eccentricity of the center of gravity, the eccentricity is mechanically fixed and hardware changes are required to adjust for PV modules of different weight.

Some embodiments disclosed herein obtain perfect balance regardless of the weight of all the rotating components. A linkage, which ties two rows that are unbalanced in opposite directions, cancels out the imbalance as long as both rows have identical components. This allows trackers to use PV modules of any size and weight and the perfect balance is unaffected.

Even in conventional single row trackers, some dual drive shaft embodiments disclosed herein have benefits. In the case of torque tube designs, the dual shaft drive embodiments disclosed herein allow for a reduction of torque loads on the tube so as to allow a tube configuration that is a constant section and longer without concern for dynamic rotational frequencies. This is possible since the dual drive shaft retains the torque loads at each post or support. Instead of a direct drive, some dual drive shaft embodiments disclosed herein have a reduction ratio between 12:1 and 16:1.

In the case of table structures, the dual drive shaft embodiments also have the advantage of being very stiff, like other belt or cable driven designs, but without the mechanical complexity that allows a single shaft to drive the cables on both sides. The dual belt drive embodiments further have the advantage of allowing the structure to be very closely balanced, eliminating gravity loads that are high when the center of rotation cannot be near the center of gravity of the rotating structure.

The dual parallel axis drive shaft embodiments disclosed herein may be used as an alternative to any tracker currently using one drive shaft to eliminate gravity loads and to improve dynamic behavior. It is an innovation that may be applied to both torque tube structures and table modular structures.

DETAILED DESCRIPTION

Figure 1:
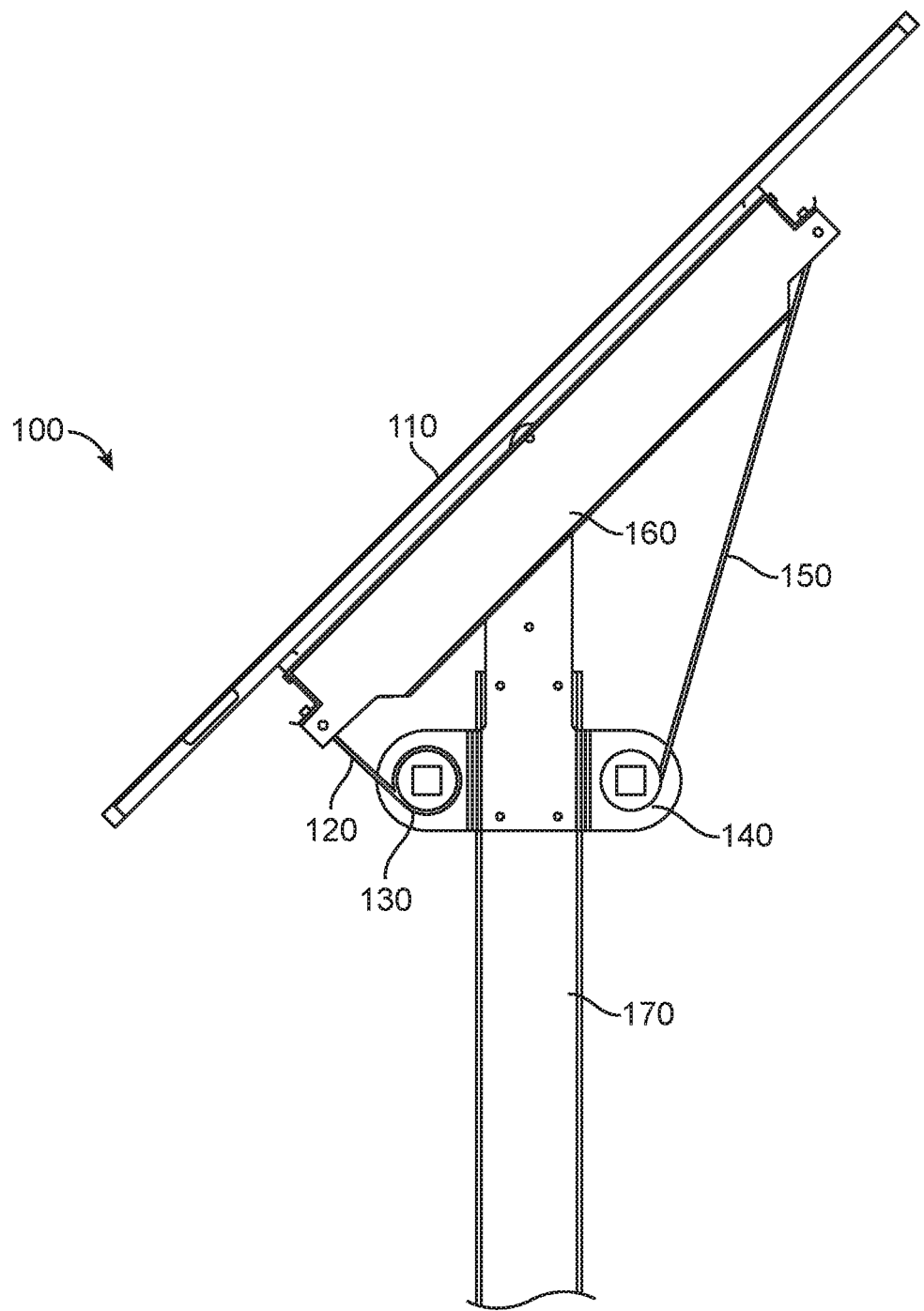
FIG. 1 illustrates one embodiment of a side view of a dual drive shaft solar tracker system.

FIG. 1 illustrates one embodiment of a side view of a dual drive shaft solar tracker system. Specifically, for the embodiment shown in FIG. 1, the dual drive shaft solar tracker system is configured to support a single row of photovoltaic (PV) elements (i.e., one or more PV modules arranged in a single row). The dual drive shaft solar tracker system (100) comprises a first drive shaft (130) and a second driveshaft (140). The support structure of the dual drive shaft solar tracker system (100) includes a pivot mechanism 160, which is pivotally coupled to post (170). For this embodiment, a first belt mechanism (120) controls rotation of the pivot mechanism (160) at the bottom portion, and subsequently the PV structure (110), whereas a second belt mechanism (150) controls rotation of the pivot mechanism (160) at the top portion.

Figure 2:
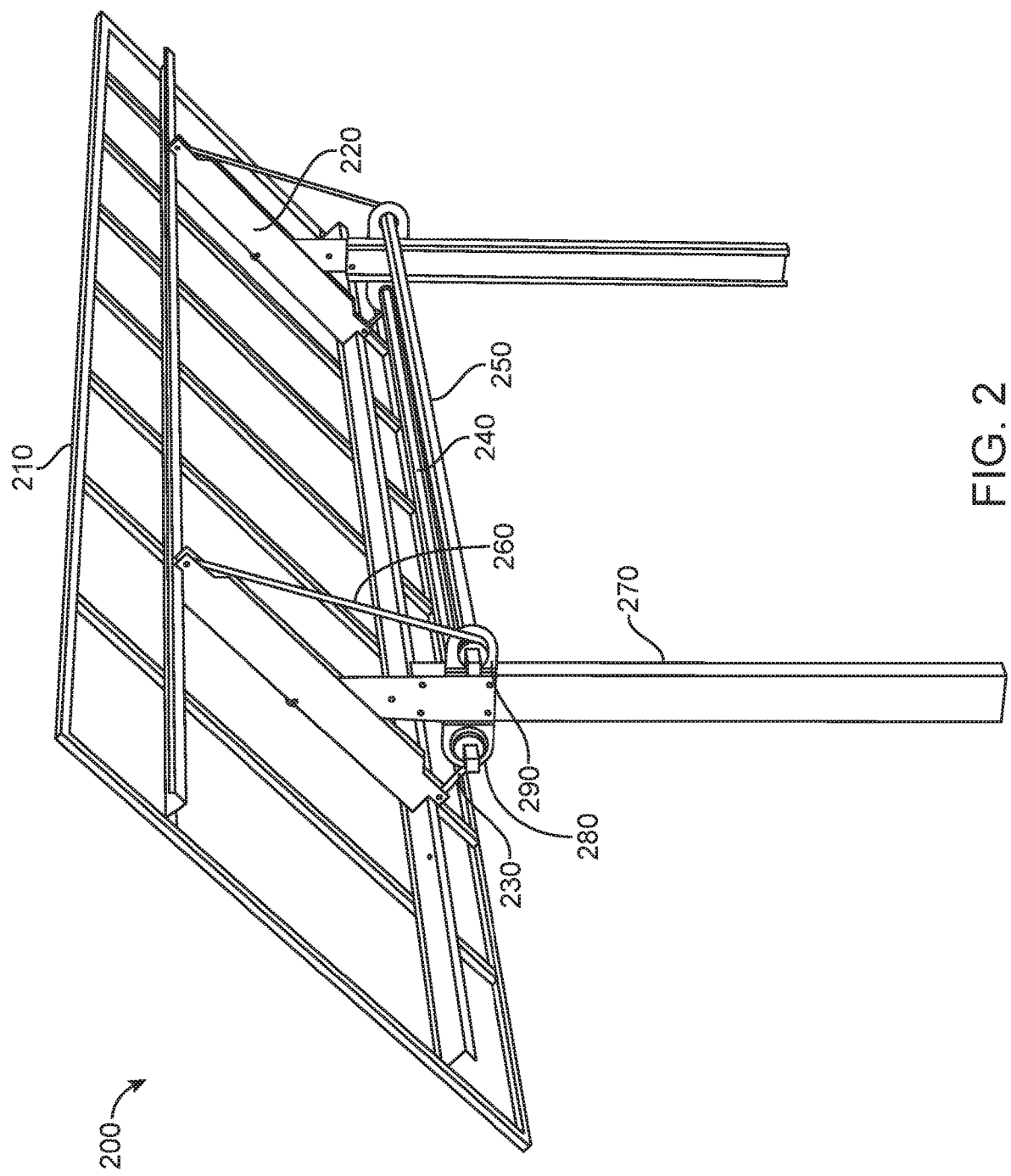
FIG. 2 illustrates one embodiment of a perspective view of a dual drive shaft solar tracker system, configured to control rotation of a single row of photovoltaic elements.

FIG. 2 illustrates one embodiment of a perspective view of a dual drive shaft solar tracker system, configured to control rotation of a single row of photovoltaic elements. For this embodiment, a first drive shaft (240) is configured, in a parallel and symmetric disposition with respect to a second drive shaft (250). A pivot mechanism (220) consists of a structure to support a PV structure (210). The support structure (270) includes, for this embodiment, two posts. A first belt mechanism controls rotation of the bottom portion of the PV structure by wrapping belt (230) around hub (280), at both ends of the dual shaft drive solar tracker system (200). Similarly, a second belt mechanism controls rotation of the top portion of the PV structure (210) by wrapping belt (260) around the hub (290).

The dual axis solar tracker system embodiments disclosed herein utilize a pair of rotatable drive shafts, which define a pair of parallel axes (See 610 in FIG. 6), with the pair of rotatable drive shafts for rotating a truss structure supporting one or more photovoltaic structures. A pair of belts is attached to the support (e.g., truss) structure and to the pair of rotatable shafts such that when the rotatable drive shafts are rotated by a corresponding pair of electric motors, the pair of belts wrap around corresponding rotatable drive shafts. For a typical single axis solar tracker system, the belt or cable drive is in a symmetrical configuration around a single drive shaft that defines a single axis of rotation, with the single drive shaft a certain distance to the center of rotation and the cables are attached to opposite end of the rotating structure. For the wrapping rate of the cables to be constant, the cables have to be supported to retain a circular shape. Without that support, when the cables have one end on a rotating structure travelling in a circular path, and the other end wrapping around a smaller diameter shaft, the rate of change of the cable length with respect to the rotation of the structure is not linear. Some current systems solve this problem by creating a wrapping device that has a spiral shape designed to wrap the cable at a variable rate so that the drive rotation and the structure rotation have a linear relationship.

Some embodiments disclosed herein have a separate drive shaft for each side of the system, so that the non-linearity of the wrapping rate may, in some embodiments, be programmed to drive each shaft at the required rate, so as to accommodate the non-linearity of the belt wrapping. This allows the mechanical design to be independent of any concern with synchronizing the shaft rotation with the tracker motion. In some embodiments, the wrapping hub is a simple cylindrical shape. When using belts, the wrapping radius is variable and also accommodates the changing wrapping radius of a belt that wraps in a spiral as multiple rotations lay the belt over the previous wrap.

In some embodiments, the non-linear relationship between the angular position of the drive shaft and the tracker is determined mathematically, given the hub radius, the thickness of the belt band, and the geometry of the rotation centers. In some embodiments, the algorithmic solution relates the tracker motion to the rotation of each shaft, accounting for the non-linear rate of change of the belt drive including the change in radius of the wrapping spiral.

In other embodiments, the non-linear relationship between the angular position of the drive shaft and the tracker is determined empirically through a calibration procedure. In some of these embodiments, the calibration procedure is perfomed by a control system that includes an inclinometer. To execte the calibration procedure, the control system generates data that reflects the location of the angle of rotation of each shaft for any given angle of the pivot arm, as measured by an inclinometer. The control system uses the data to build a table of rotation points for each shaft describing the full range of rotation of the tracker arm. The table is stored in the control system for subsequent use during operation.

A motor controller drives both independent motors, and controls each drive shaft position. The positioning process is controlled electronically by the motor controller so as to control the motors to control each shaft position.

In some embodiments, the motor controller drives a single motor, and the motor rotation is linearly related to the angular position of the tracker. So, a closed loop, driven by the inclinometer signal, is established, and the motor is rotated one way or the other until the inclinometer signal equals whatever value is required by the position of the sun at any particular time. The two motors are driven at the same time but the rate of rotation between the motors follows a non-linear function that is determined by the geometry of the system. For these embodiments, the motor controller has the capability to drive two motors independently.

Figure 3:
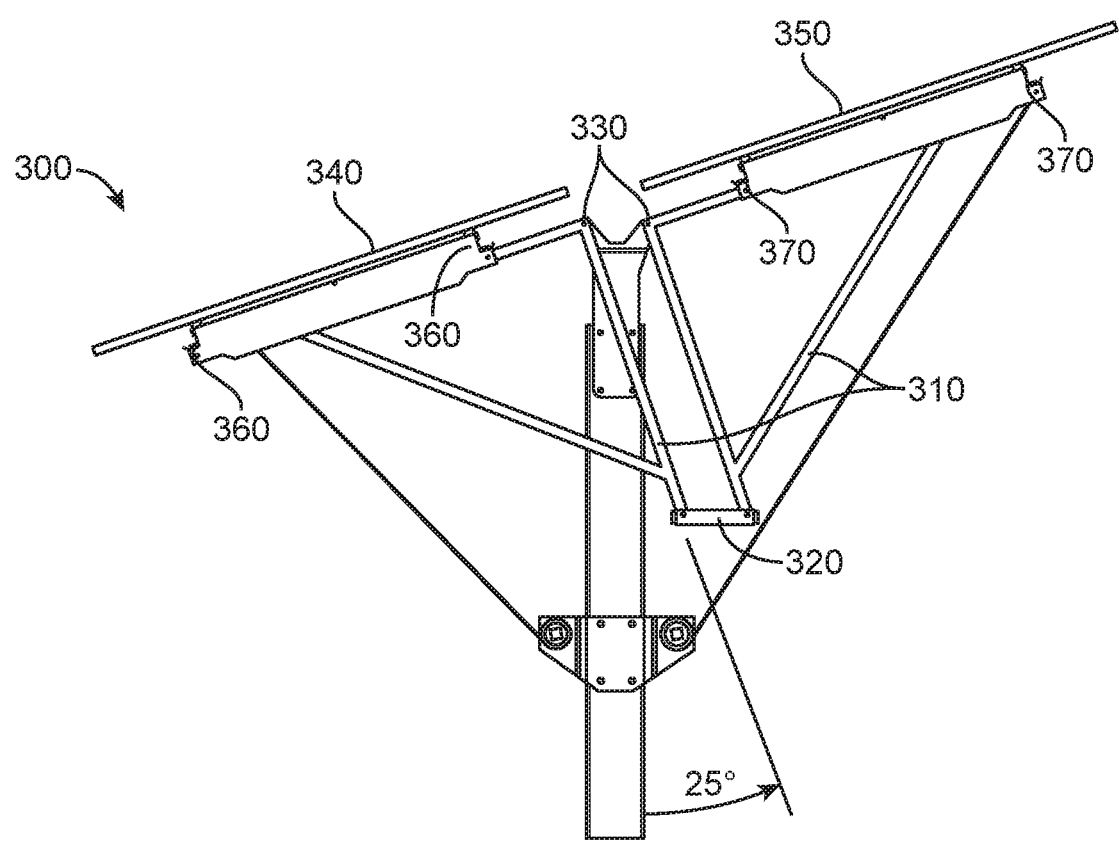
FIG. 3 illustrates a side view for one embodiment of a dual drive shaft solar tracker system with a linked self-balancing mechanism.

FIG. 3 illustrates a side view for one embodiment of a dual drive shaft solar tracker system with a linked self-balancing mechanism. A dual shaft drive solar tracker system (300) is configured to support a dual row of PV modules (340 and 350) (i.e., dual row architecture). The linked self-balancing mechanism of the dual drive shaft solar tracker system (300) includes first and second rotating arms (310). As shown in FIG. 3, for this embodiment, the first and second rotating arms (310) are configured as triangles. The first and second rotating arms (310) are rigidly coupled to purlins (360 and 370), which support first and second PV structures (340 and 350). The first and second rotating arms (310) are coupled by a linkage (330). The linkage (330) is configured such that it cancels gravity loads exerted on the first PV row (340) with gravity loads exerted on the second PV (350), so as to cancel out imbalances. For this embodiment, the dual drive shaft solar tracker system (300) includes a dual drive shaft mechanism in order to rotate the dual row of PV structures (340 and 350).

In some embodiments, the triangular rotating arms are very stiff, due to efficient use of materials, and capable of supporting a heavy row of PV modules. Thus, this architecture is cost effective in terms of material usage. The components are also light weight, thus allowing manipulation without mechanical means so as to make assembly easier and safer.

The linked self-balancing mechanism is illustrated in FIG. 3. For this embodiment, there are two centers of rotation. Each row of panels is supported by a triangular shaped rotating arm (310), located on each post. The two rotating arms (310) support two sets of purlins (360 and 370), where two rows of PV modules (340 and 350) are mounted. At each post, the rotating arms are connected through a linkage (330), which results in a balanced system. Each side of the dual shaft drive solar tracker system is biased by having its center of gravity far from the center of gravity of the system. The linkage allows the imbalances to exert bias in opposite directions, cancelling each other.

Figure 4:
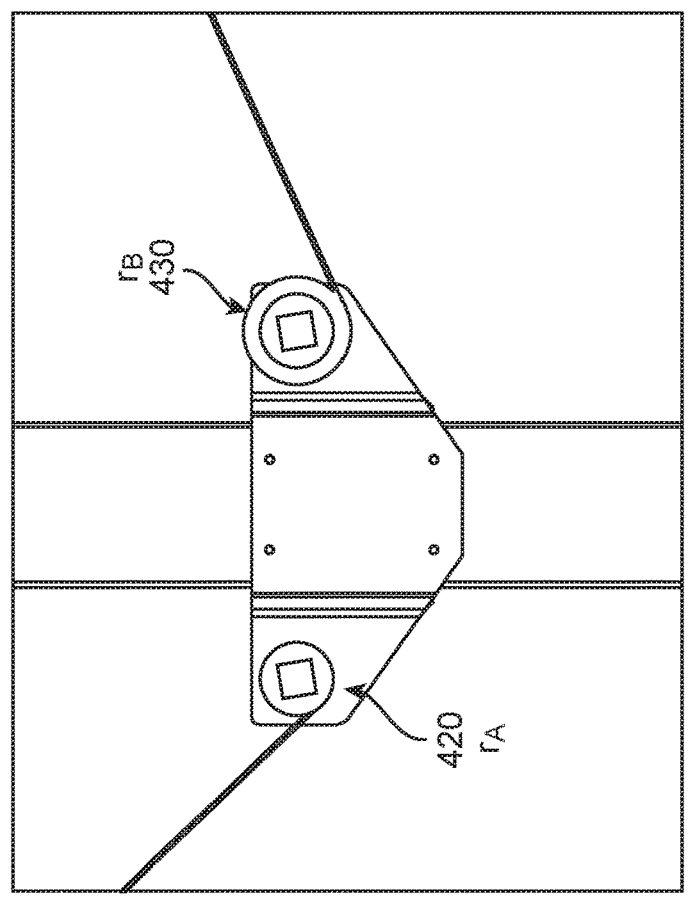
FIG. 4 illustrates another side view of the dual drive shaft solar tracker system with a linked self-balancing mechanism.
Figure 4:
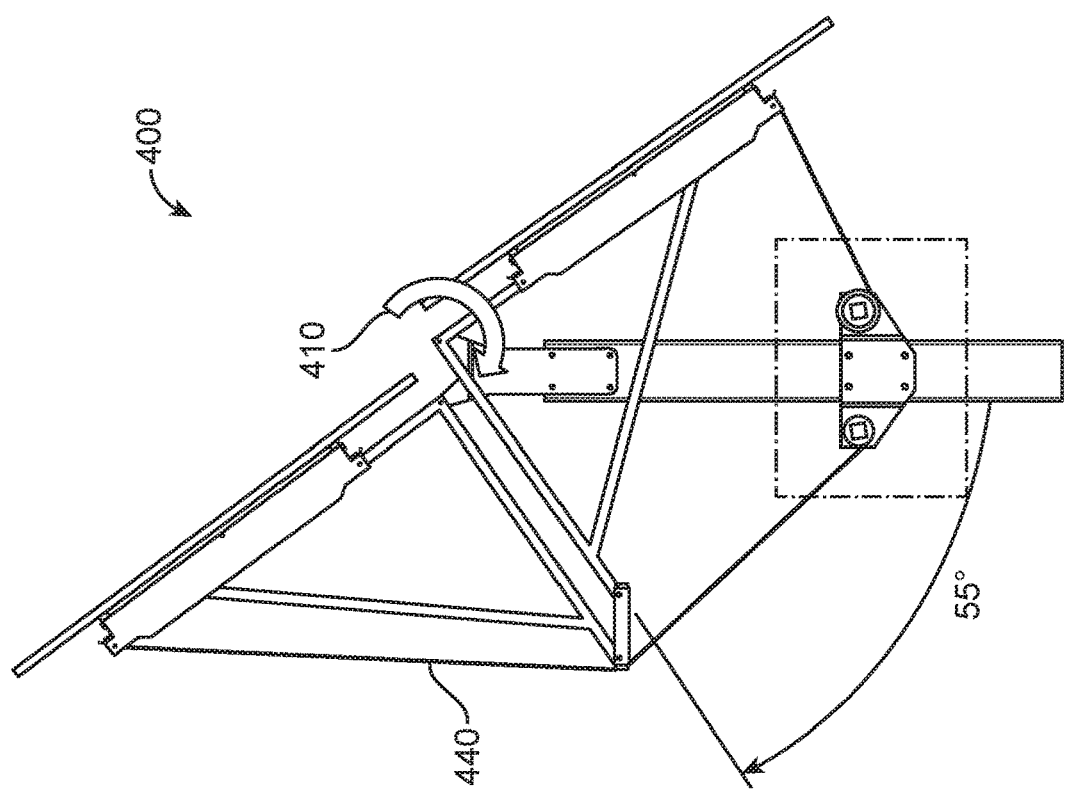

FIG. 4 illustrates another side view of the dual drive shaft solar tracker system with a linked self-balancing mechanism, including a detailed view that includes belts and hubs. In the view of FIG. 4, the dual shaft drive solar tracker system with a linked self-balancing mechanism (400) is shown rotated at a 55° angle, through an axis of rotation illustrated by arrow (410). As shown in FIG. 4, hub (420) has a radius of $r_A$, and hub (430) has a radius of $r_B$. As shown, $r_B > r_A$. On the smaller extension of the belt, the wrapping radius increases, thereby reducing leverage. If $r_B > r_A$ at the shaft, then leverage is higher for longer belt extensions.

An additional advantage of the dual row architecture is that as the wrapping radius of an overlapping belt changes, it increases for shorter belt length and it reduces for longer belt length. This effect counteracts another effect that has the opposite bias since the geometry of a rotating end of the belt results in a larger torque lever in a short belt length and a smaller leverage arm in a longer belt length.

In some embodiments depicted in the configuration of FIG. 4, the system 400 uses a belt of 0.200" thickness that wraps around a hub with a diameter of 3.50". The radius of the belt is determined by calculating the number of wraps for each position. At the 55-degree position shown in FIG. 4, the dimensions result in a reduction ratio of 1/21 minimum. Such a high gear ratio allows for a great reduction of the drive shaft section. In addition to increasing the leverage arm when the belt length is shorter, the introduction of a belt support at the linkage point increases the leverage arm for belt lengths beyond a certain point.

Another advantage of the embodiments disclosed herein is that the number of PV modules per post is high. Reducing the number of posts greatly impacts cost and risk of installation.

Figure 5:
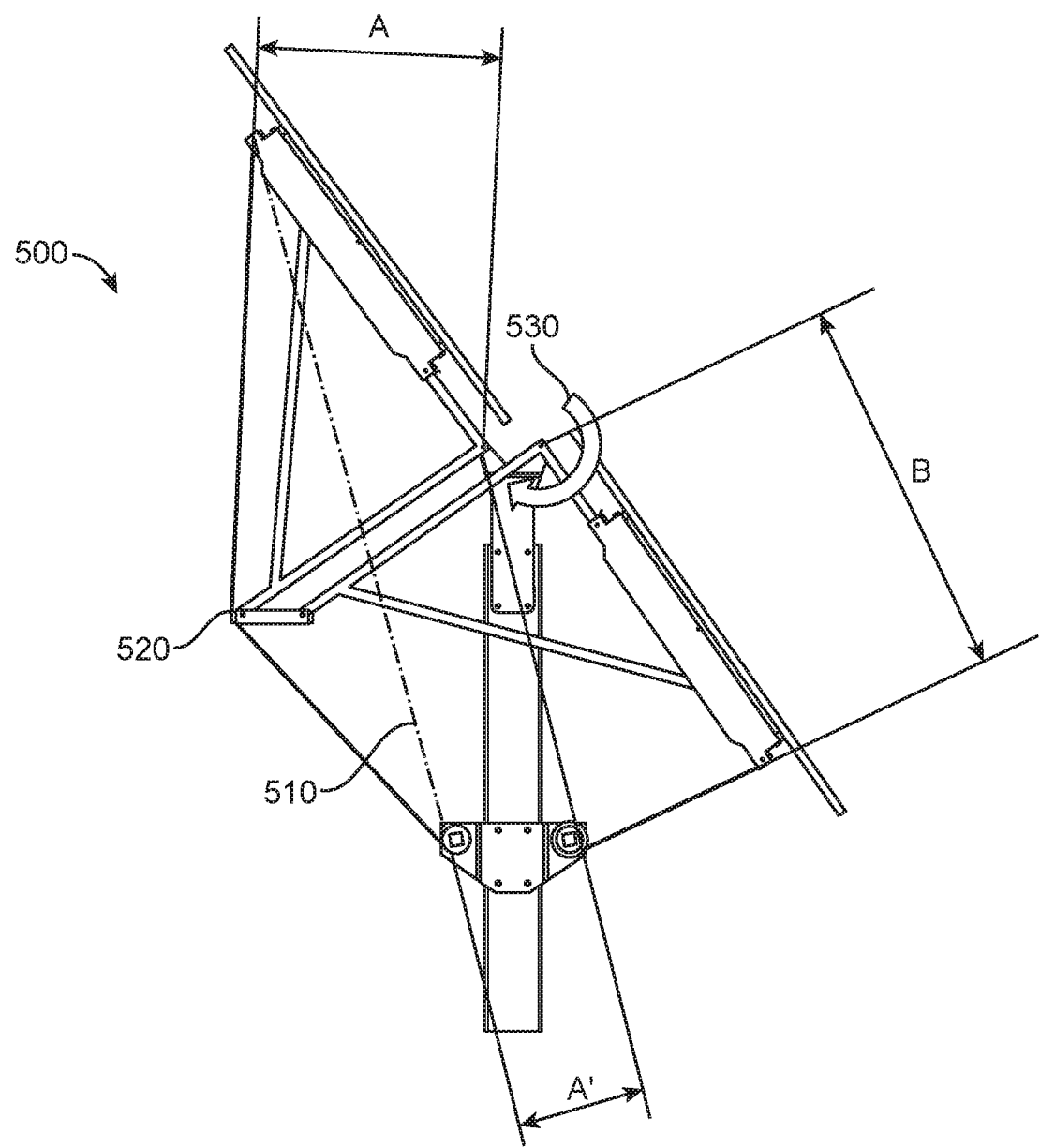
FIG. 5 illustrates another side view of the linked self-balancing solar tracking system that illustrates the effect of belt length in torque lever arm.

FIG. 5 illustrates another side view of the linked self-balancing solar tracking system that illustrates the effect of belt length in torque lever arm. The illustration of FIG. 5 also shows use of linkage (520) to support the belt in this configuration. Dashed line 510 illustrates the geometry of the belt without support from linkage (520). Using the linkage (520) to support the belt in positions of high elbow extension adds to the leverage, and thereby reduces belt tension. As shown in FIG. 5, the system is rotated, illustrated by arrow (530), so as to create the A and A', and B dimensions. As illustrated in FIG. 5, lever arm A is much larger than lever arm A'. On smaller angles, the lever arm increases. As such, lever B is larger than levers A or A'. In one embodiment, leverage at the extremes does not vary much:

$r_A = 1.75$;
$r_B = 2.95$;
A=49.2";
B=62.9";
$r_A/A = 1/28$; and
$r_B/B = 1/21$.

Figure 6:
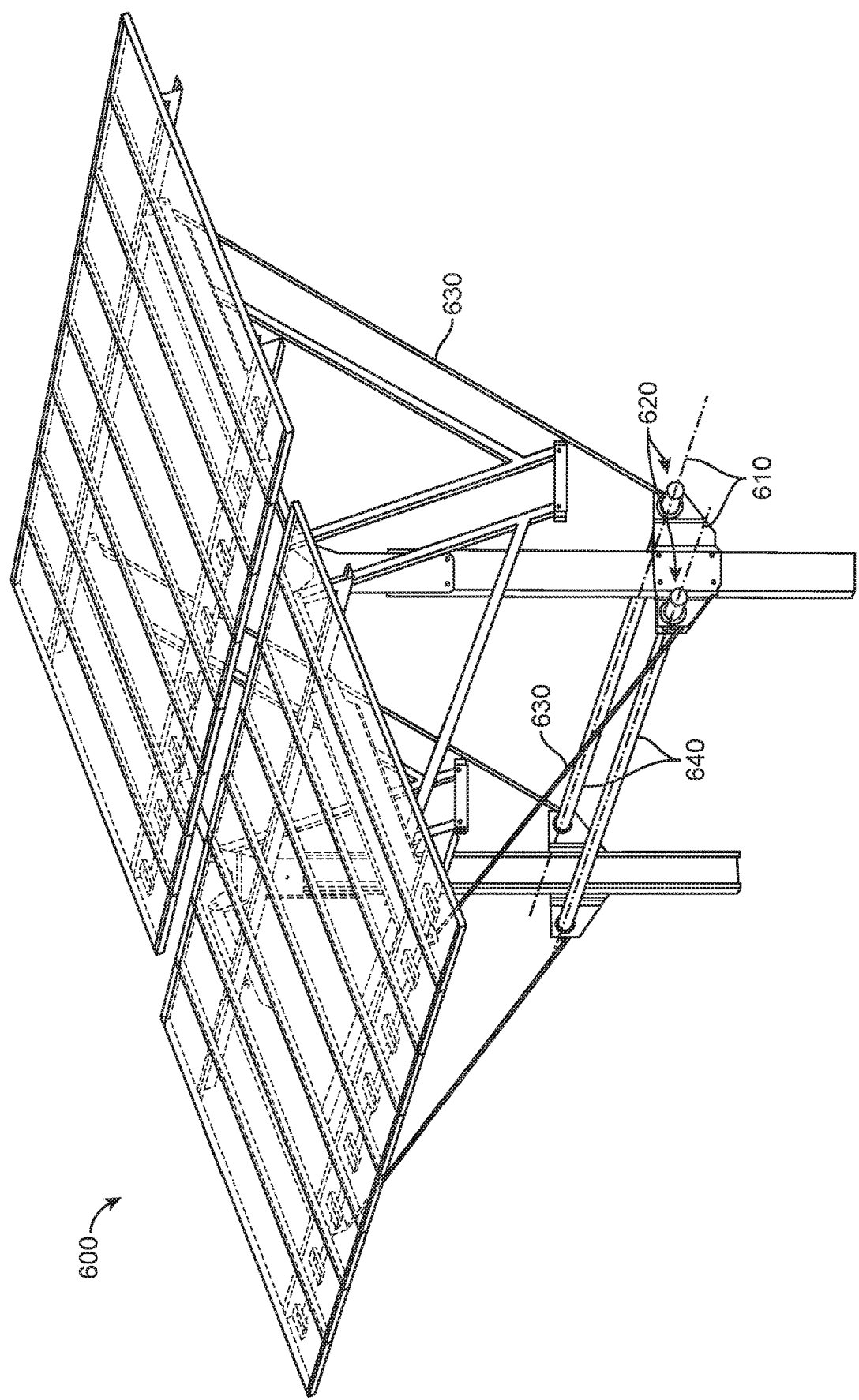
FIG. 6 illustrates a perspective view of one embodiment of a dual drive shaft solar tracker with a dual-row architecture and a linked self-balancing system.

FIG. 6 illustrates a perspective view of one embodiment of a dual shaft drive solar tracker with a dual-row architecture and a linked self-balancing mechanism. The solar tracker (600) constitutes a single table structure. For this embodiment, parallel axes of rotation (610) are shown for shaft drives (640). Belts (630) are shown coupling the dual shaft drives (640) to the pivot mechanism. For this embodiment, motors (620) are configured at the end of the table structure.

Figure 7:
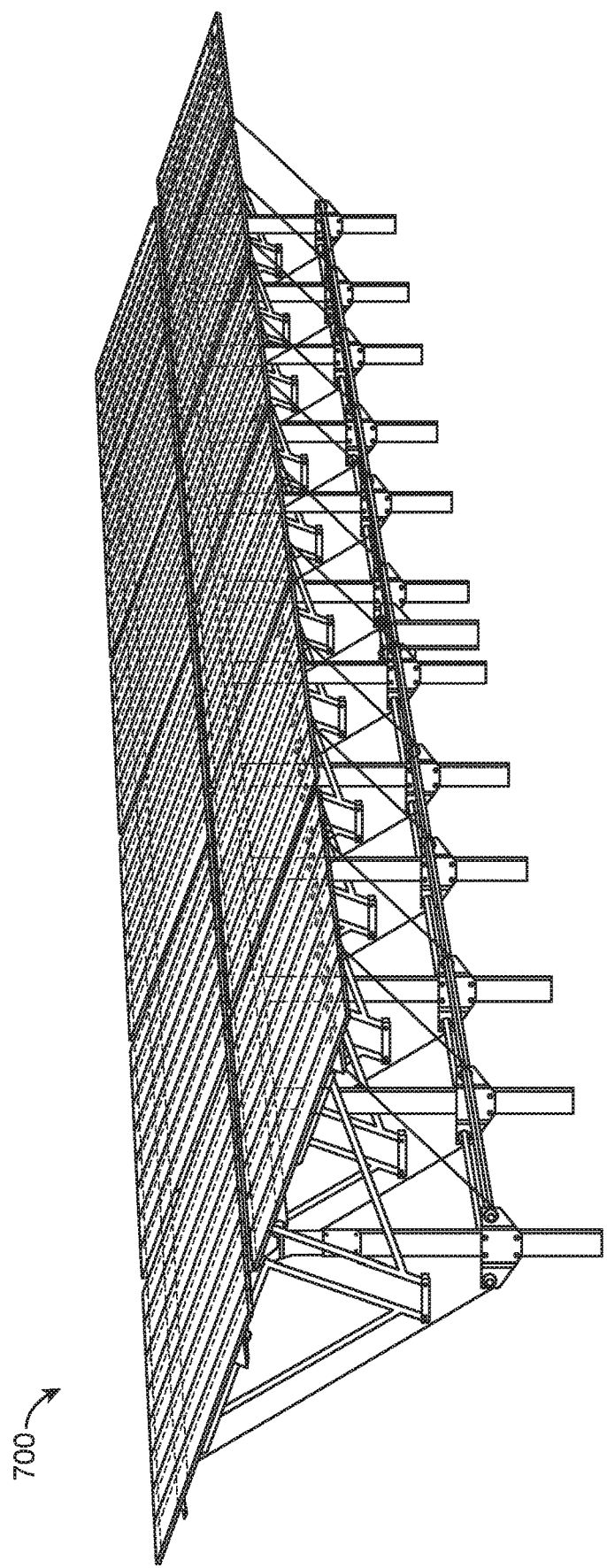
FIG. 7 illustrates one embodiment of multi-table solar tracker system.

FIG. 7 illustrates one embodiment of multi-table solar tracker system. The multi-table solar tracker system (700) constitutes multiple single table structures coupled together through the dual drive shafts. Specifically, The multi-table solar tracker system (700) includes 11 tables, cascaded together.

Figure 8:
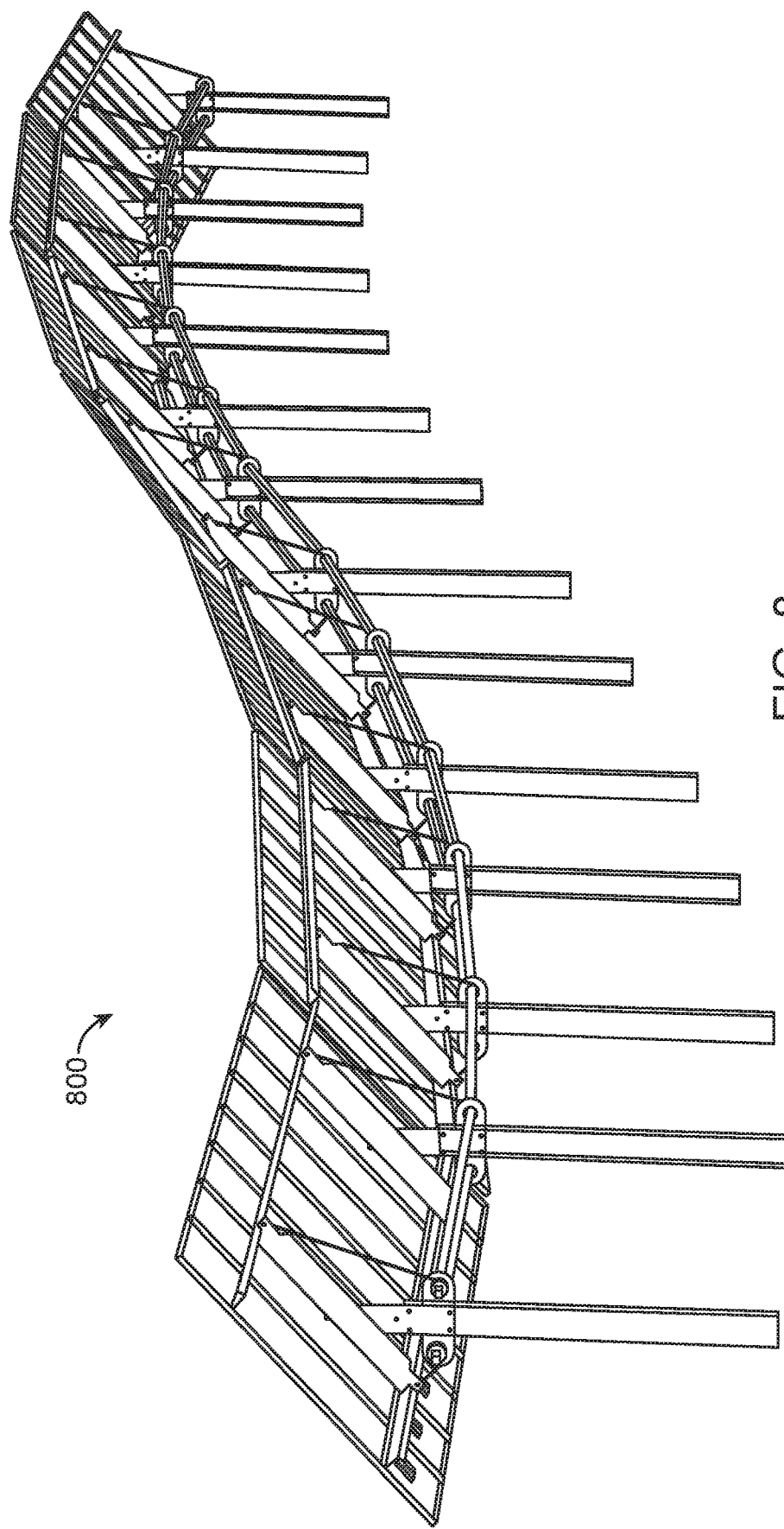
FIG. 8 illustrates one embodiment of a bottom perspective view of a multi-table solar tracker system.

FIG. 8 illustrates one embodiment of a bottom perspective view of a multi-table solar tracker system. For this example, multi-table solar tracker system (800) is configured on uneven ground. Thus, even under conditions of uneven ground, the dual drive shafts of the multi-table solar tracker system (800) may be adjusted to support the cascade of multiple table structures together to form a single system.

The small section drive shafts which support a small torque load (because of the reduction ratio of this system) are relatively flexible and can accommodate misalignment between tables. The elastic bending, which for angles around 3 degrees, induce bending stresses in the shaft do not have much impact in the torque required from the drive motors even when shafts are rigidly coupled. A rigid coupling system is simpler with lower costs and less backlash than systems coupled with universal joints or other couplings that take up the misalignment without shaft bending.

Figure 9:
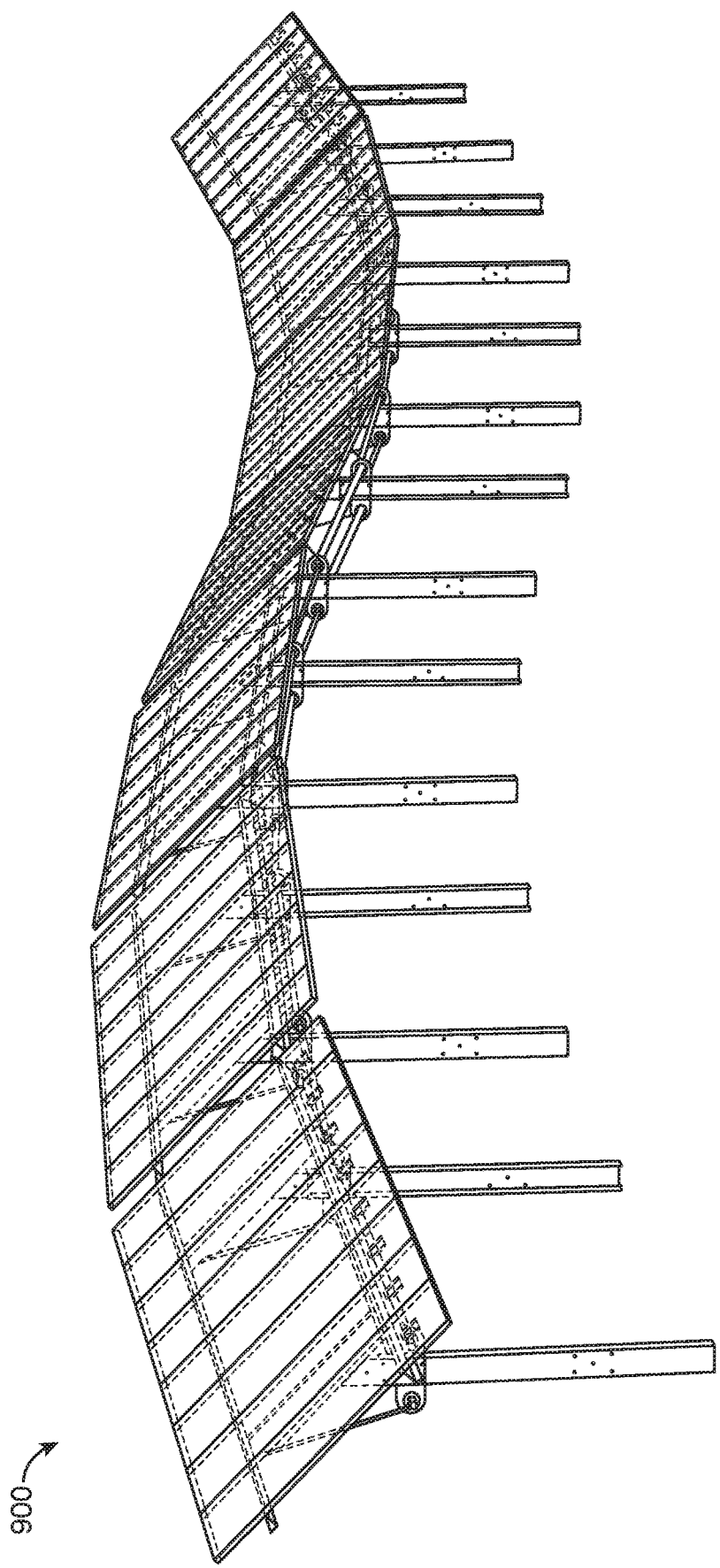
FIG. 9 illustrates one embodiment of a top perspective view of a multi-table solar tracker system.

FIG. 9 illustrates one embodiment of a top perspective view of a multi-table solar tracker system. For this example, multi-table solar tracker system (900) is configured on uneven ground.

Figure 10:
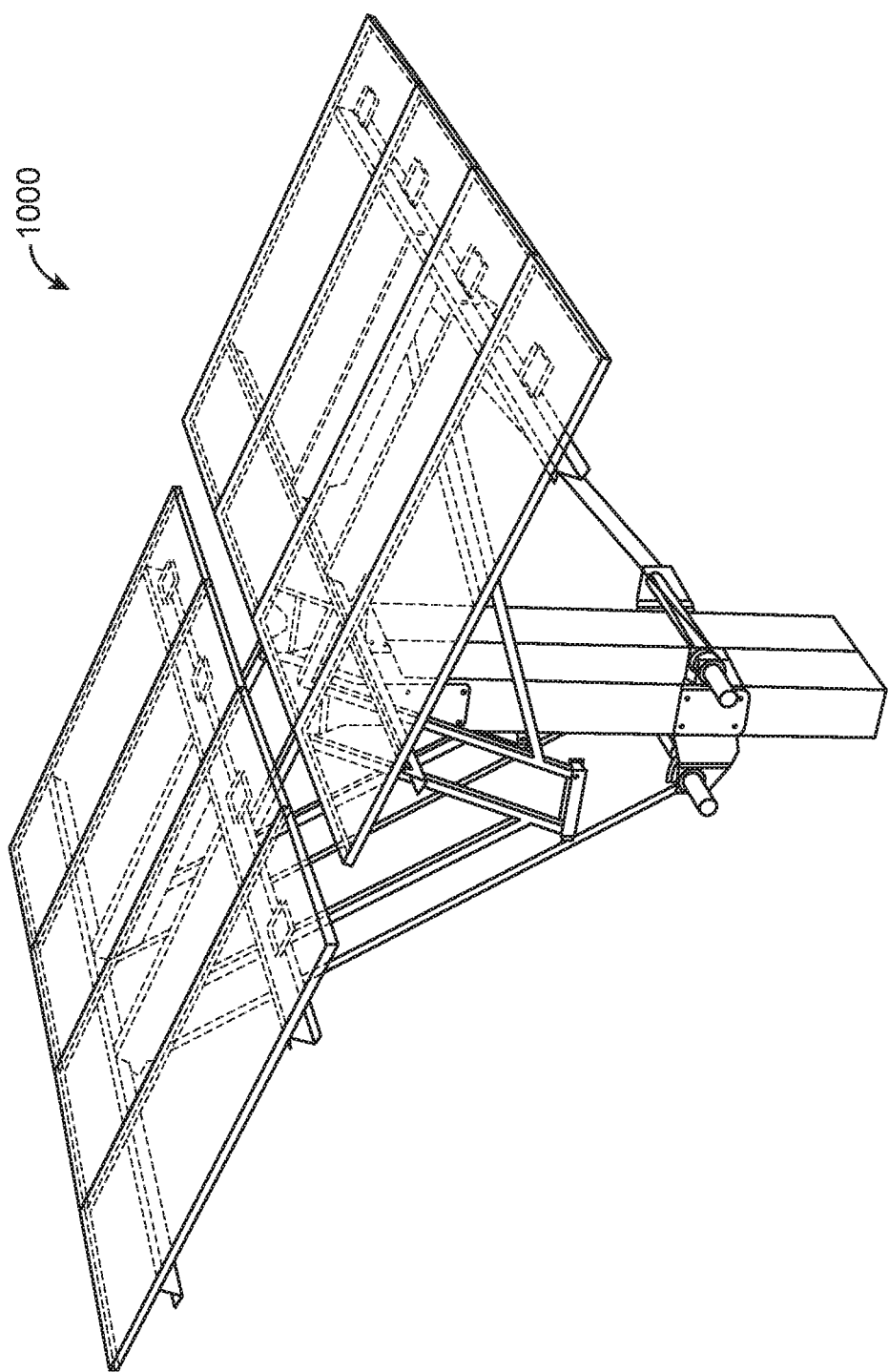
FIG. 10 illustrates one embodiment of a perspective view of a dual row, dual drive shaft solar tracker.

In another embodiment, the above described dual axis tracker system embodiments employ two or more support posts, but may be readily adapted for use with a single support post configuration. FIG. 10 illustrates one embodiment of a perspective view of a dual row, dual drive shaft solar tracker. For this embodiment, solar tracker 1000, a single table structure, is configured with a single post (i.e., as opposed to a multi-post embodiment).

Figure 11:
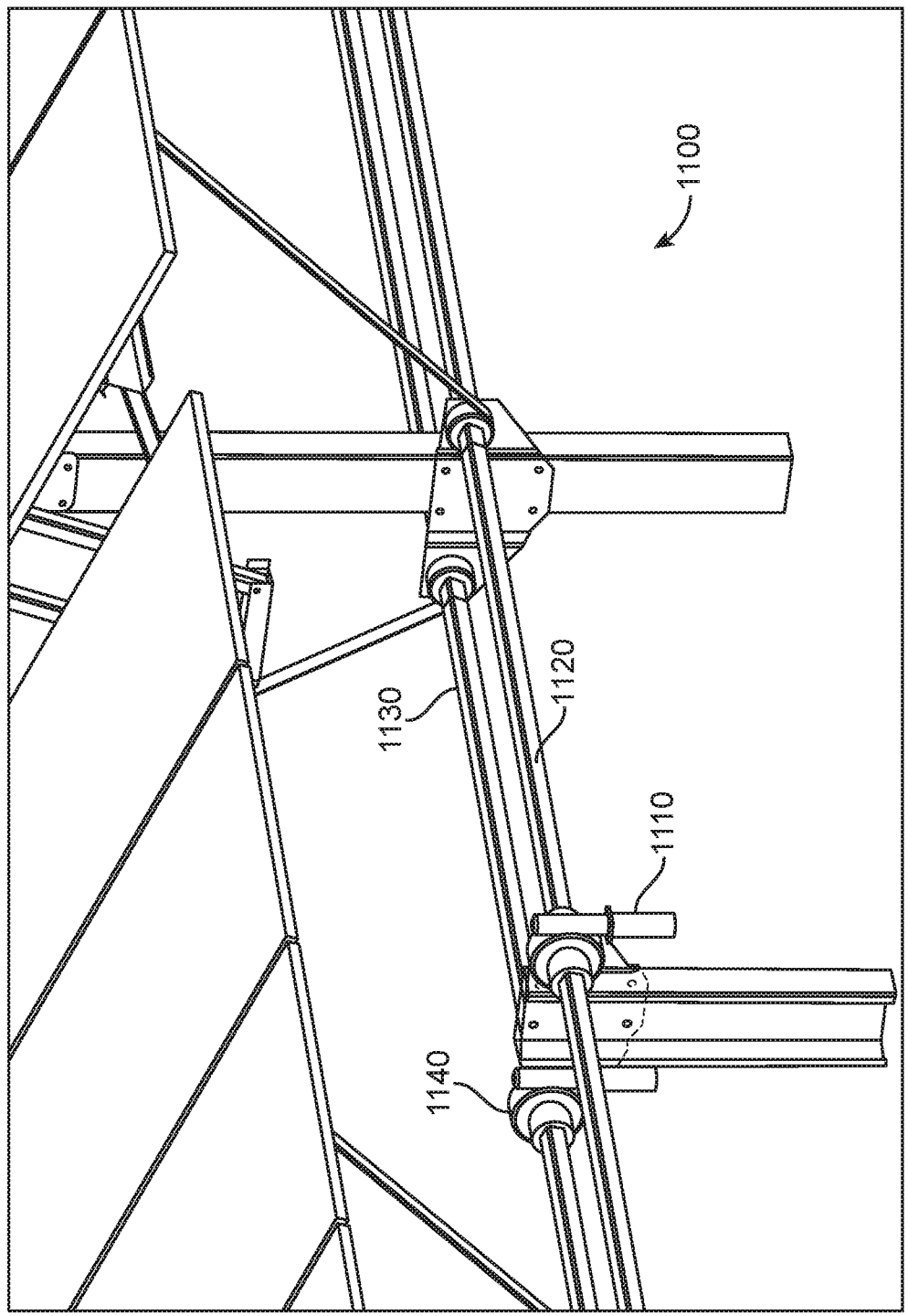
FIG. 11 illustrates one embodiment of a perspective view of a dual drive shaft solar tracker system with motors mounted in the middle of a table structure.

FIG. 11 illustrates one embodiment of a perspective view of a dual shaft drive solar tracker system with motors mounted in the middle of a table structure. Specifically, solar tracker (1100) includes drive shafts (1120, 1130) coupled to electric motors (1110, 1140). Solar tracker system (1100) includes at least two adjacent table structures, as shown. Electric motors (1110, 1140) are disposed in the center of a table structure.

Figure 12:
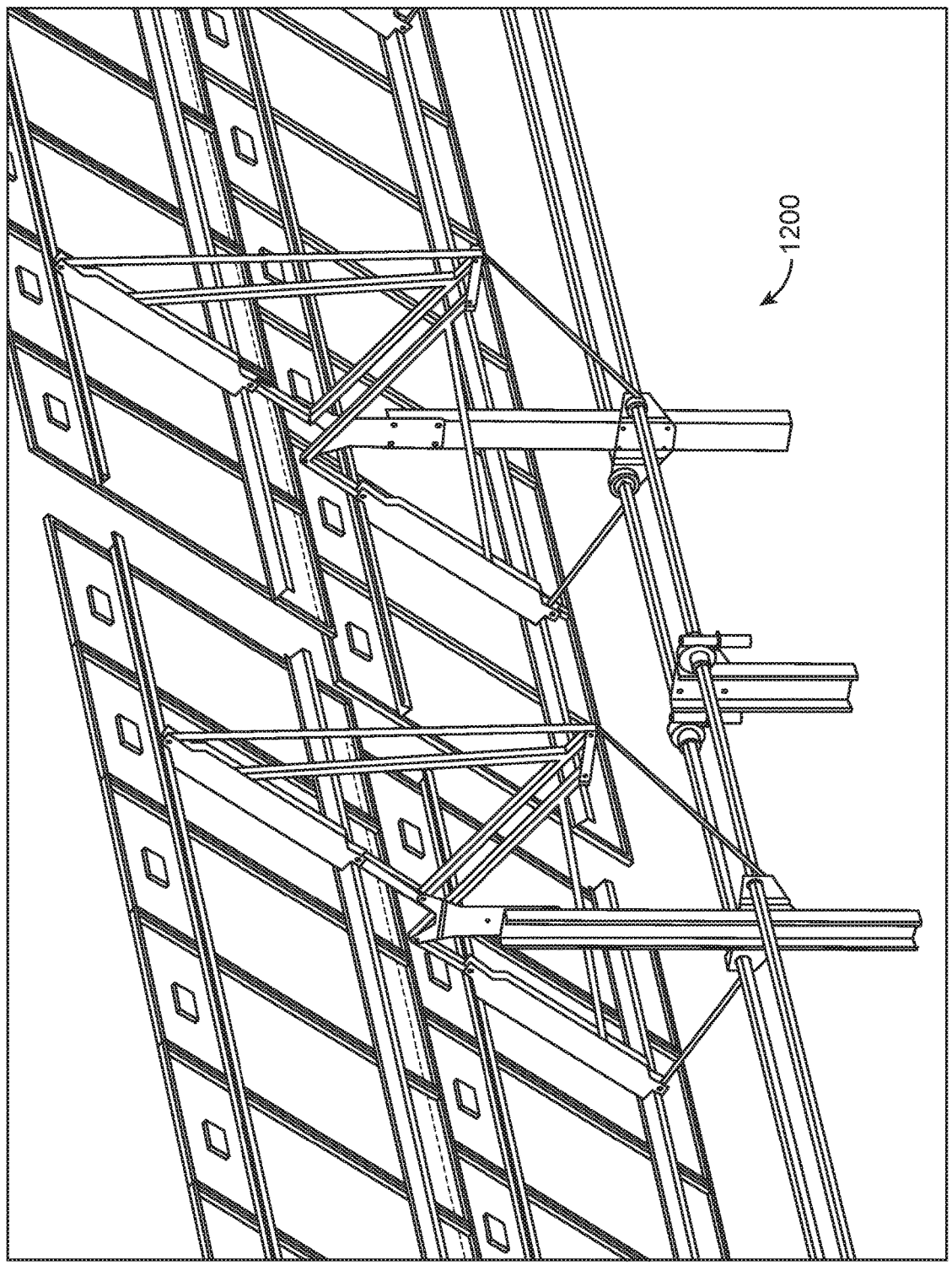
FIG. 12 illustrates one embodiment of a rear perspective view of a multi-table, dual drive shaft solar tracker system.

FIG. 12 illustrates one embodiment of a rear perspective view of a multi-table, dual drive shaft solar tracker system. For this embodiment, the multi-table, dual drive shaft solar tracker system (1200) comprises electric motors disposed between two adjacent table structures.

Figure 13:
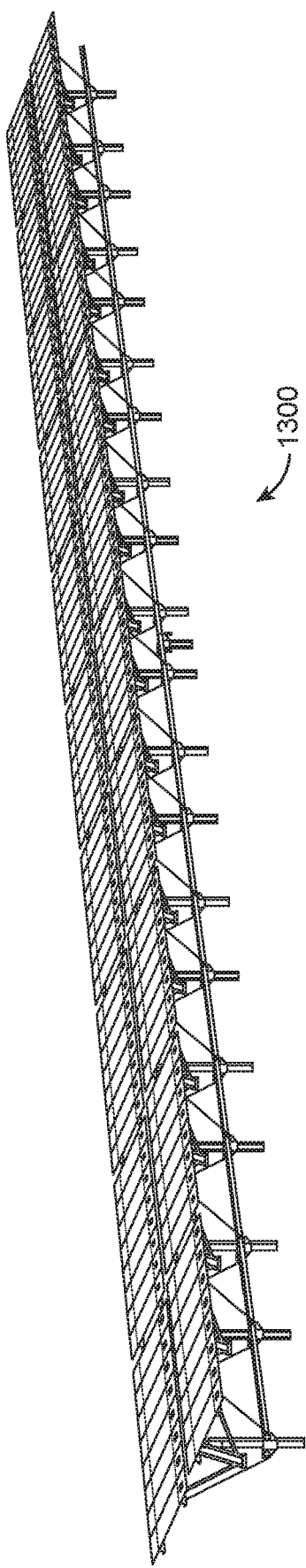
FIG. 13 illustrates one embodiment of a top perspective view of a multi-table, dual drive shaft solar tracker system.

FIG. 13 illustrates one embodiment of a top perspective view of a multi-table, dual drive shaft solar tracker system. In this embodiment, multi-table, dual drive shaft solar tracker system (1300) is configured to cascade 10 table structures.

Figure 14:
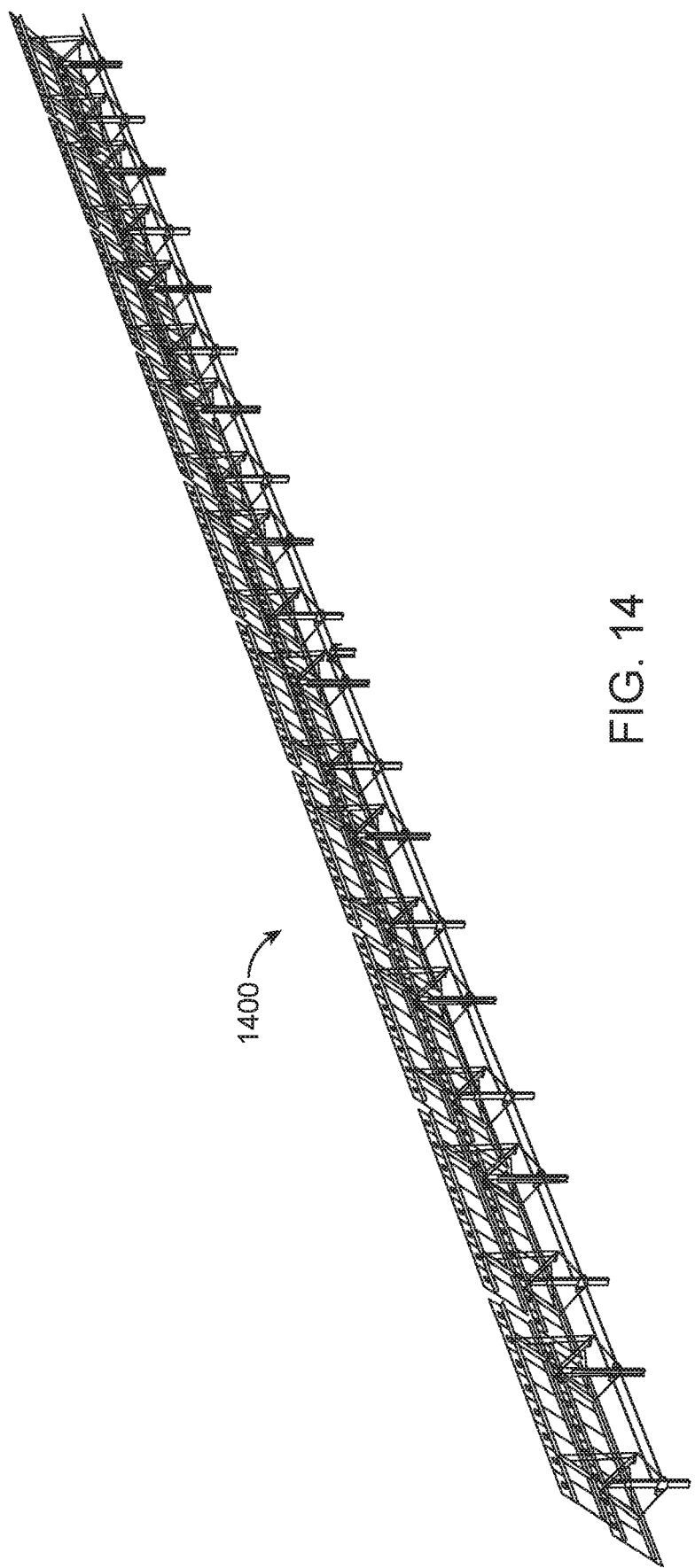
FIG. 14 illustrates one embodiment of a top perspective view of a multi-table, dual drive shaft solar tracker system.

FIG. 14 illustrates one embodiment of a top perspective view of a multi-table, dual drive shaft solar tracker system. In this embodiment, multi-table, dual drive shaft solar tracker system (1400) is configured to cascade 10 table structures.

Figure 15:
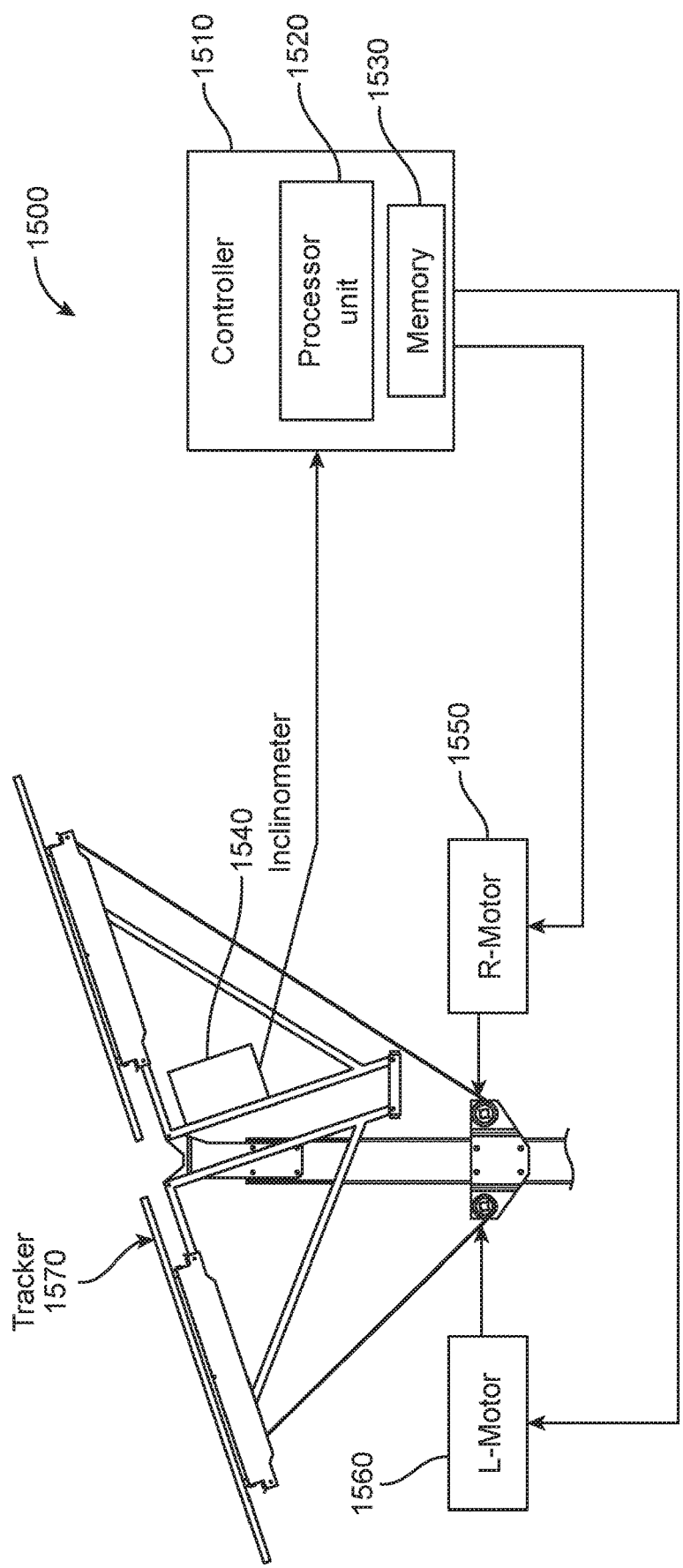
FIG. 15 illustrates one embodiment of a dual drive shaft solar tracker system, depicting features a control system.

FIG. 15 illustrates one embodiment of a dual drive shaft solar tracker system (1500), depicting features a control system. The embodiment of FIG. 15 illustrates a tracker (1570) with a dual row of PV modules. A controller (1510), which controls the tilt of the PV modules, includes a processor unit (1520) and memory (1530). The controller (1510) is electrically coupled to a right motor (1550) and to a left motor (1560). As described above, the motors (1550 and 1560) rotate the respective drive shafts to effectuate the desired tilt of the PV modules. An inclinometer (1540) measures the tilt of the PV modules for feedback to the controller (1510).

Figure 16:
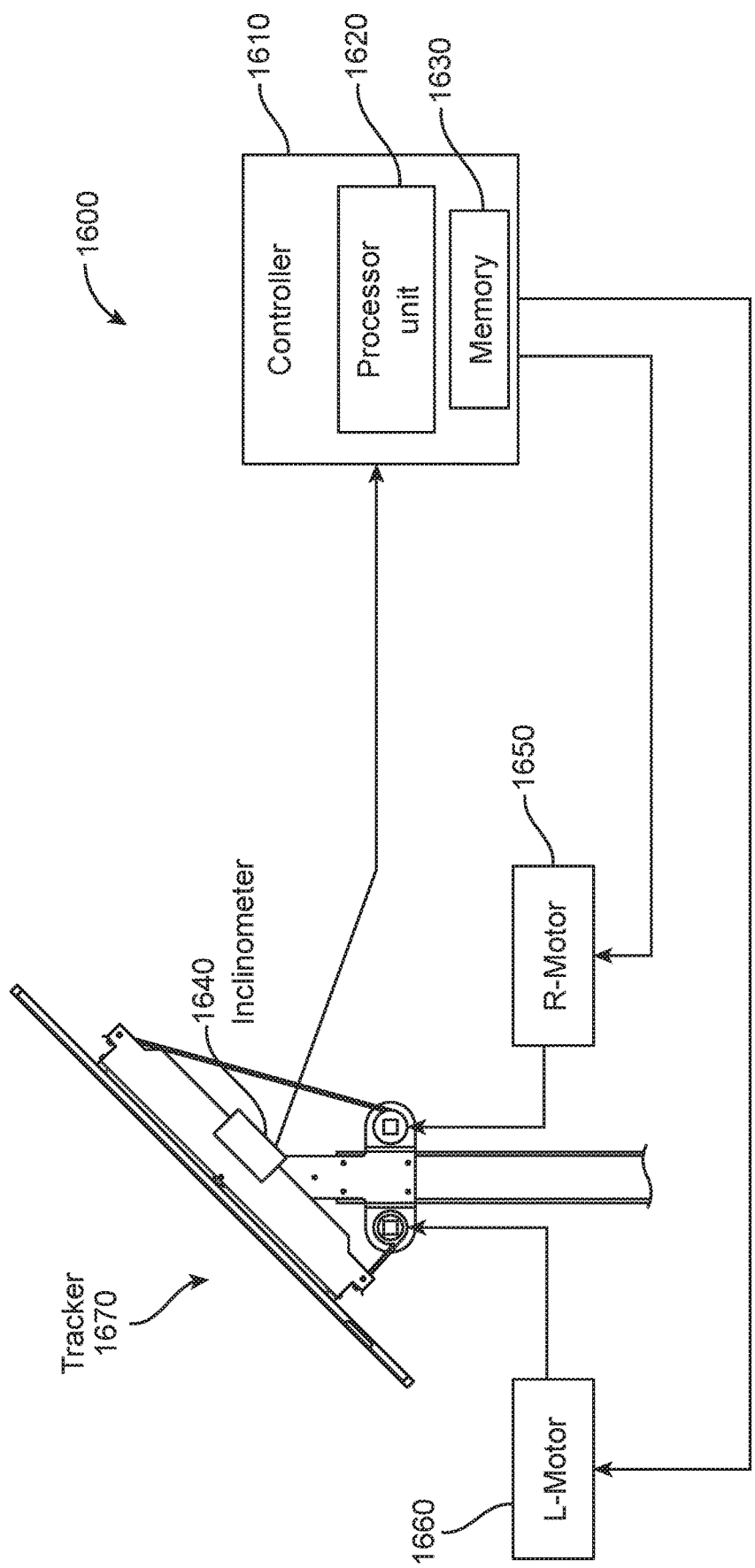
FIG. 16 illustrates another embodiment of a dual drive shaft solar tracker system, also depicting features of a control system.

FIG. 16 illustrates another embodiment of a dual driveshaft solar tracker system (1600), also depicting features of a control system. For this embodiment, the tracker (1670) is for a single row of PV modules. Similar to the embodiment of FIG. 15, the controller (1610), which includes processor unit (1620) and memory (1630), controls the tilt of the PV modules by controlling the right motor (1650) and left motor (1660), using a sensing and feedback mechanism of an inclinometer (1640).

Although the present invention has been described in terms of specific exemplary embodiments, it will be appreciated that various modifications and alterations might be made by those skilled in the art without departing from the spirit and scope of the invention.

What is claimed is:

1. A dual parallel axis drive shaft solar tracker system, comprising:
   a photovoltaic (PV) structure comprising at least one solar panel;
   a support structure comprising a pivot mechanism to pivotally support the PV structure across a range of motion;
   dual parallel axis drive shafts comprising a first drive shaft configured in a parallel and symmetric disposition with respect to a second drive shaft;
   a first belt mechanism, comprising a first belt, coupled to the first drive shaft, wherein the first drive shaft and the first drive mechanism are configured to tilt a top side of the PV structure;
   a second belt mechanism, comprising a second belt, coupled to the second drive shaft, wherein the second drive shaft and the second drive mechanism are configured to tilt a bottom side of the PV structure;
   wherein a non-linear wrapping rate exists between an angular position of both the first and second drive shafts and a position of the pivot mechanism; and
   wherein, movement of the PV structure occurs by turning both the first and second drive shafts in parallel so as to wrap the first belt of the first belt mechanism onto the first drive shaft at a first required rate to accommodate the non-linearity of the wrapping rate and to wrap the second belt of the second belt mechanism onto the second drive shaft at a second required rate to accommodate the non-linearity of the wrapping rate.

2. The dual parallel axis drive shaft solar tracker system as set forth in claim 1, wherein:
   the photovoltaic (PV) structure comprises a single row of the at least one solar panel;
   the support structure comprises:
      a first post deposed at a first end of the dual parallel axis drive shaft solar tracker system;
      a second post deposed at a second end of the dual parallel axis drive shaft solar tracker system so as to support the dual parallel axis drive shaft solar tracker system;
   the pivot mechanism comprises:
      a first pivot arm comprising a top and a bottom coupled to the PV structure and pivotally coupled to the first post so as to permit rotation of the PV structure at the first end of the dual parallel axis drive shaft solar tracker system;
      a second pivot arm comprising a top and a bottom coupled to the PV structure and pivotally coupled to the second post so as to permit rotation of the PV structure at the second end of the dual parallel axis drive shaft solar tracker system;
   the first and second shaft belt drives comprise:
      a plurality of hubs coupled to first and second sides of the first and second posts;
      the first drive shaft couples one of the hubs on the first side of the first post at the first end of the dual parallel axis drive shaft solar tracker system to one of the hubs on the first side of the second post at the second end of the dual parallel axis drive shaft solar tracker system;

the second drive shaft couples one of the hubs on the second side of the first post at the first end of dual parallel axis drive shaft solar tracker system to one of the hubs on the second side of the second post at the second end of the dual parallel axis drive shaft solar tracker system;

the first belt of the first belt mechanism couples the first drive shaft to the top side of the first pivot arm;

a third belt of the first belt mechanism couples the first drive shaft to the top side of the second pivot arm;

the second belt of the second belt mechanism couples the second drive shaft to the bottom side of the first pivot arm; and a fourth belt of the second belt mechanism couples the second drive shaft to the bottom side of the second pivot arm.

3. The dual parallel axis drive shaft solar tracker system as set forth in claim 2, wherein the hubs comprise a cylindrical shape.

4. The dual parallel axis drive shaft solar tracker system as set forth in claim 1, further comprising:

at least one electric motor to drive the first and second drive shafts; and a motor controller to independently drive the electric motors to independently control the first and second drive shafts.

5. The dual parallel axis drive shaft solar tracker system as set forth in claim 4, further comprising:

a tracker; and a processor unit and memory, coupled to the motor controller, wherein the non-linear wrapping rate, expressed as the relationship between the angular position of the first and second drive shafts and the angular position of the tracker, is stored in the memory and is based on the radius of the hub, the thickness of the belts, and the geometry of the rotation centers.

6. The dual parallel axis drive shaft solar tracker system as set forth in claim 4, further comprising:

a tracker; and a processor unit and memory, coupled to the motor controller, wherein the memory stores an algorithm to relate motion of the tracker to rotation of both the first and second drive shafts, so as to account for the non-linear wrapping rate of change of the belt drive including a change in radius as a result of a wrapping spiral of the belts wrapped around the first and second drive shafts.

7. The dual parallel axis drive shaft solar tracker system as set forth in claim 4, further comprising:

a tracker; and a processor unit and memory, coupled to the motor controller, wherein the processor unit to execute a calibration procedure to derive the required rate to accommodate the non-linearity of the wrapping rate based on the relationship between an angular position of the first and second drive shafts and the tracker.

8. The dual parallel axis drive shaft solar tracker system as set forth in claim 4, further comprising:

a tracker;

an inclinometer; and a processor unit and memory, coupled to the motor controller, wherein the processor unit and memory to execute a calibration procedure to derive the first and second required rates to accommodate the non-linearity of the wrapping rate based on the relationship between the angular position of the drive shafts by measuring, with the inclinometer, an angle of rotation of each of the first and second drive shafts for any given angle of the pivot mechanism and to build a table of rotation points for the first and second drive shafts that describes the full range of rotation of the tracker.

9. The dual parallel axis drive shaft solar tracker system as set forth in claim 1, wherein the PV structure, the pivot mechanism, the first drive shaft, the first belt mechanism, the second drive shaft and the second belt mechanism comprises a table, the dual parallel axis drive shaft solar tracker system further comprising:

a plurality of tables, configured in an adjacent manner, such that the first and second drive shafts of adjacent tables are coupled.

10. The dual parallel axis drive shaft solar tracker system as set forth in claim 9, wherein the first and second drive shafts of adjacent tables are coupled so as to tolerate angular misalignment, whereby the adjacent tables possess a lose requirement for alignment.

11. The dual parallel axis drive shaft solar tracker system as set forth in claim 9, further comprising a single motor for each of the first and second drive shafts.

12. The dual parallel axis drive shaft solar tracker system as set forth in claim 11, wherein the single motor is positioned at the end of one of the tables.

13. The dual parallel axis drive shaft solar tracker system as set forth in claim 11, wherein the single motor is positioned between two adjacent tables.

14. The dual parallel axis drive shaft solar tracker system as set forth in claim 1, wherein:

the photovoltaic (PV) structure comprises a first PV row, comprising at least one solar panel and a second PV row, comprising at least one solar panel, horizontally deposed to the first PV row;

the structure support comprises:

at least one post and a first triangular shaped rotating arm to support the first PV row and a second triangular shaped rotating arm to support the second PV row;

a linkage, coupled to the first PV row and the second PV row, to couple the first triangular shaped rotating arm with the second triangular shaped rotating arm so as to permit uniform rotation of the first and second PV rows; and a pair of hubs, coupled to the first and second drive shafts, disposed to generate parallel axes of rotation between the first and second drive shafts.

15. The dual parallel axis drive shaft solar tracker system as set forth in claim 14, wherein the linkage comprises a length such that the linkage supports the first and second belts during positions of high belt extension so as to add to the leverage and reduce belt tension.

16. The dual parallel axis drive shaft solar tracker system as set forth in claim 14, wherein the linkage cancels gravity loads exerted on the first PV row with gravity loads exerted on the second PV row so as to cancel out imbalances.

17. The dual parallel axis drive shaft solar tracker system as set forth in claim 14, wherein the post comprises a plurality of posts.

18. A linked self-balancing solar tracker system, comprising:

a photovoltaic (PV) structure comprising a first PV row, comprising at least one solar panel, and a second PV row, comprising at least one solar panel, horizontally deposed to the first PV row, wherein the first PV row and the second PV comprise substantially similar weights of solar panels;

a first rotating arm to support the first PV row and a second rotating arm to support the second PV row; and a linkage, coupled to the first PV row and the second PV row, to couple the first rotating arm with the second rotating arm, such that the linkage cancels gravity loads exerted on the first PV row with gravity loads exerted on the second PV row so as to cancel out imbalances.

19. The linked self-balancing solar tracker system as set forth in claim 18, further comprising:

a first drive shaft and a first belt mechanism, comprising at least one belt, coupled to the first drive shaft, wherein the first drive shaft and the first drive mechanism are configured to tilt the first rotating arm;

a second drive shaft and a second belt mechanism, comprising at least one belt, coupled to the second drive shaft, wherein the second drive shaft and the second drive mechanism are configured to tilt the second rotating arm; and wherein, movement of the PV structure occurs by wrapping at least one belt of the first belt mechanism onto the first drive shaft and by wrapping at least one belt of the second belt mechanism onto the second drive shaft so as to provide a non-linear wrapping rate to accommodate the non-linearity of the belt wrapping onto the first and second drive shafts.

20. The linked self-balancing solar tracker system as set forth in claim 18, wherein the linkage comprises a length such that the linkage supports the first and second belts during positions of high belt extension so as to add to the leverage and reduce belt tension.

\* \* \* \* \*